Jan. 15, 1963
E. LAVERDISSE
3,073,075
GLASS POLISHING APPARATUS
Filed Aug. 1, 1960
5 Sheets-Sheet 1
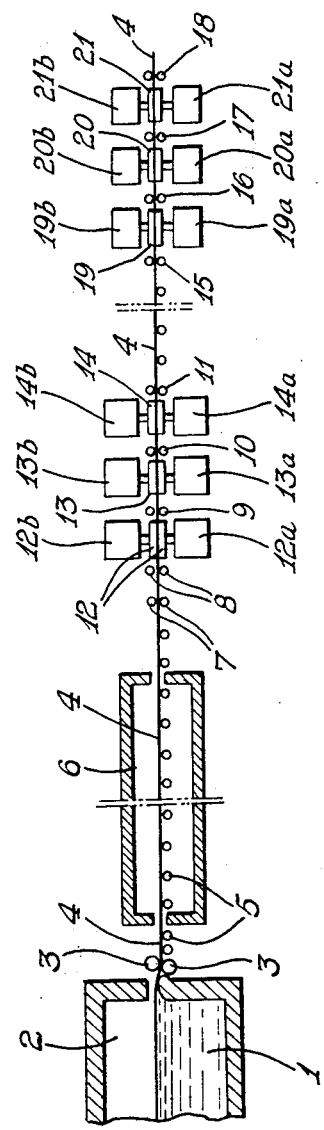
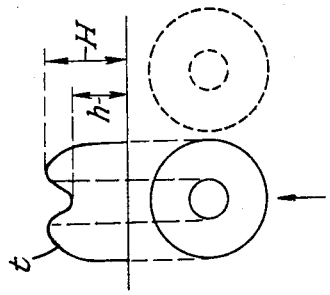

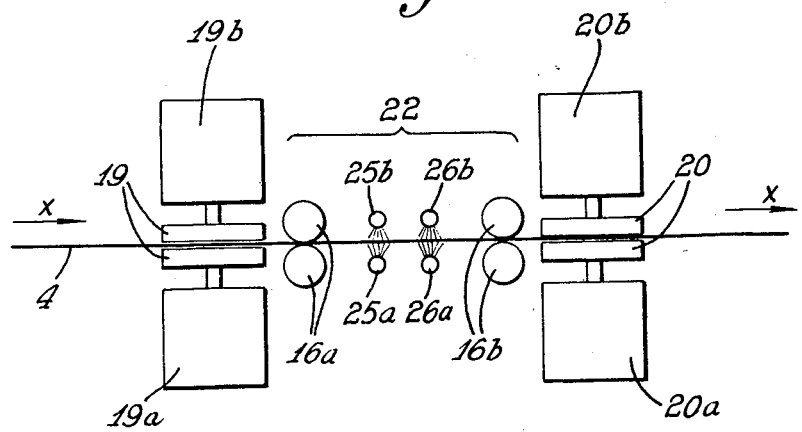
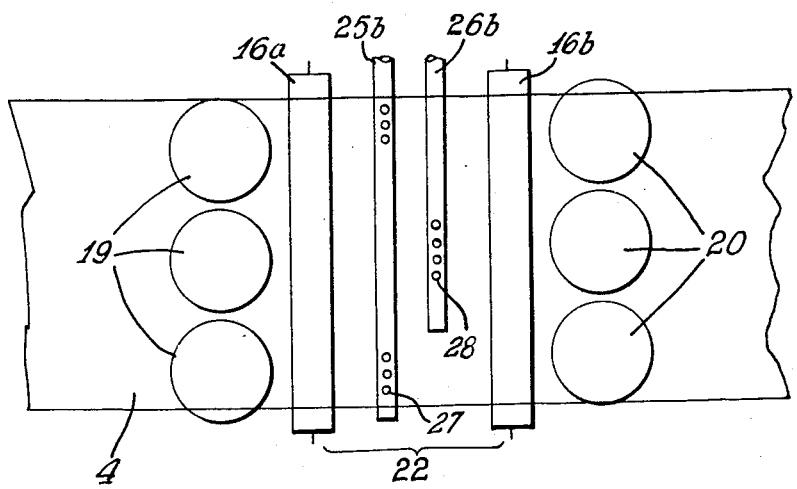

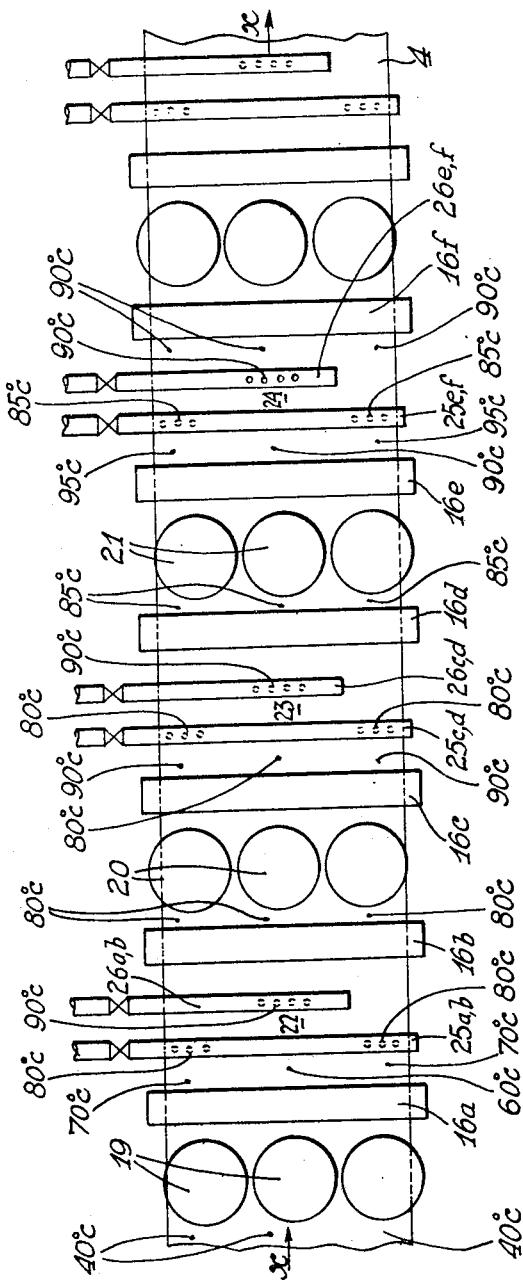

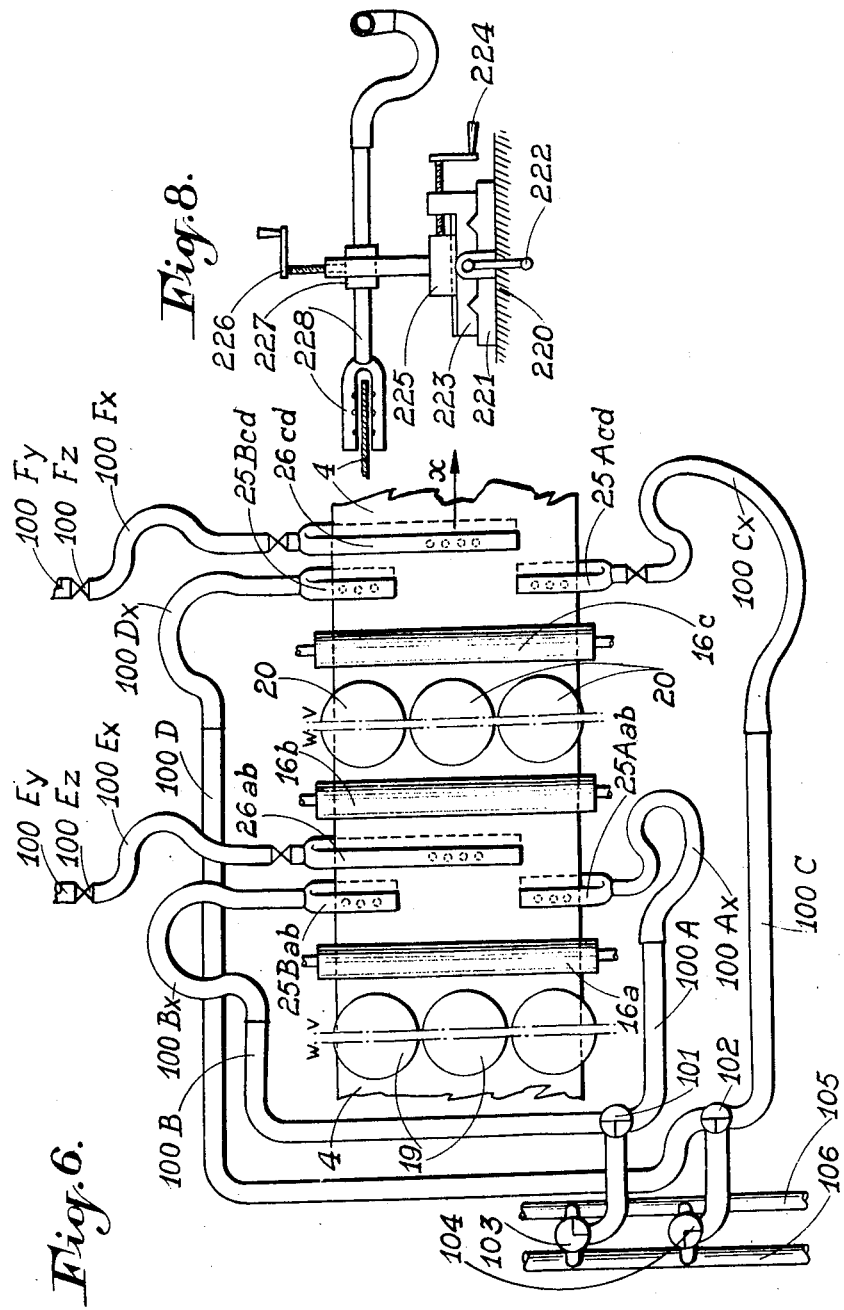

Jan. 15, 1963 E. LAVERDISSE 3,073,075
GLASS POLISHING APPARATUS
Filed Aug. 1, 1960 5 Sheets-Sheet 5

3,073,075
GLASS POLISHING APPARATUS

Edmond Laverdisse, Auvelais, Belgium, assignor to Les Glaceries de la Sambre Societe Anonyme, Auvelais, Belgium, a Belgian company
Filed Aug. 1, 1960, Ser. No. 46,600
Claims priority, application Belgium Aug. 8, 1959
3 Claims. (Cl. 51—112)

The present invention relates to a process and an apparatus for controlling and adjusting the temperatures of glass ribbon undergoing polishing and grinding treatment. More specifically, this invention is concerned with regulating the temperature of glass ribbon after it passes through grinding and polishing tools.

Polished glass is at present continuously manufactured by a process wherein a glass ribbon is successively rolled, annealed, simultaneously ground on both faces and polished in the same manner. The first three operations are currently carried out continuously. The performance of the last operation, i.e. the polishing, still gives rise to some difficulties, which are generally due to the heating of the glass resulting from friction of the felt-lined tools (polishers). This is mainly due to the abrasive which is situated between the felt and the glass surface of the polishers, which are mounted face-to-face in lower and upper beams and rotate at an appropriate speed. When these polishers are applied against the glass with pressures which vary from about 5 to 15 kg. per square decimetre, the glass becomes progressively heated under the action of the friction developed thereon as the working progresses and the surface film of the glass sheet reaches temperatures of the order of several hundred degrees centigrade, which is a favourable condition for the production of a "good polish."

These high temperatures do not give any difficulty when they are uniformly distributed over the width of the glass sheet and balanced on the two worked faces. However, these conditions are disturbed by various other factors, namely:

(1) By the variations of the values of the frictional work of the tools in the direction of the width of the glass sheet, which variations are expressed by the frictional working curve of the tools;

(2) By the state of the felts, which become impregnated with polishing composition (suspension of rouge in water) and become worn with ageing, whereby their physical state is modified;

(3) By the intentional or accidental differences in the abrasive feed;

(4) By the relative positions of the polishing tools of one line or of one beam at the edge or at the center of the sheet;

(5) By the uneven evacuation of the heat imparted to the glass ribbon.

All these variable elements create inequalities in the distribution of the temperature in the glass ribbon and consequently stresses, which increase at each passage of the ribbon under the tools of one beam or between the tools of a pair of beams. If the temperature is lower on the lower face than on the upper face of the glass ribbon, the latter takes an upwardly convex form, which tends to break it. If temperature differences are set up between the edges and the center of the ribbon, longitudinal stresses are produced and yield the same result. It will be seen that, by combining all the possibilities of the distribution of the temperatures on the two faces of the glass ribbon, it is possible to create stresses which are added together or cancel one another out, but which in normal industrial working must be controlled in order to avoid disastrous breakages of the glass ribbon.

In accordance with the present invention, there is applied to at least one of the surfaces of the glass ribbon, between at least two consecutive beams or between at least two consecutive pairs of beams, for example over an area limited by at least two consecutive pairs of conveyor rollers or other rollers, a temperature adjustment which renders the temperature uniform over the entire section and over the entire width of the glass ribbon or the temperature of the marginal zones or edges of the glass ribbon. This adjustment of the temperature of the glass ribbon may be effected in accordance with the invention by any appropriate means, for example by banks of sprinklers which sprinkle water or any other appropriate liquid such as water acidulated with sulphuric acid at variable temperature or banks of jets emitting hot gas at variable temperature (air or inert gas, such for example as nitrogen, or even combustible gases), or banks of jets emitting steam at variable temperature. Electrical resistors, combined heating and cooling devices, or any other means can be used for setting up on one or both of the surfaces of the glass ribbon which has left the radius of action of a given series of polishing tools, grinding tools, a liquid or gaseous sheet or cushion or surrounding medium, or a field of thermal activity, which heats in an adjustable fashion the excessively cold points or cools in an adjustable fashion the excessively hot points of the glass ribbon.

If the adjustment of the temperature of the glass ribbon is effected in accordance with the invention by means of a liquid the stagnation of the liquid on the upper surface of the glass ribbon, between the corresponding rollers or scrapers, may constitute an additional element for rendering the temperature of the ribbon uniform and stable.

In addition, if the adjustment of the temperature is effected in accordance with the invention by the direct application of a liquid to one or both surfaces of the glass ribbon, the limitation of those parts of the surface of the ribbon to which the temperature adjustment is applied becomes increasingly necessary as the work progresses. In fact, the glass ribbon between the first beams or the first pairs of beams is sufficiently covered by the feeding of the tools with water and abrasive, so that the liquid applied as a temperature regulating medium has no influence on the total mixture. However, in the last working phase, where the temperature differences are greatest and where the supply of abrasive mixture is lower (for example from 1 centilitre per minute per square decimetre), it is necessary to avoid all communication between the working areas and the temperature adjustment areas. The latter are therefore limited, in accordance with the present invention, as hereinbefore stated, for example by means of rubber-coated rollers or by any other device forming a fluid-tight joint.

When carried out in this way, the temperature adjustment of the glass ribbon does not in any way interfere with the working of the tools, because it does not influence the feeding of the latter with abrasive mixture, since the temperature-adjusting liquid applied in accordance with the present invention is prevented from penetrating between the working tools and those parts of the glass surface to which the tools are applied at the instant under consideration.

Moreover, it has been found in accordance with the invention that, under the action of a temperature difference between the two border (marginal portions) of the glass ribbon, localised for example on a width of about 10 to 20 centimetres, the hottest band becomes curved as a result of the elongation under the effect of the expansion, and the whole glass ribbon is carried to the right or to the left in a transverse direction opposite to the hottest band.

The present invention has as its object to obviate this disadvantage by means of an aribitrarily controllable adjustment of the marginal temperature, or of the temperature of the borders, of the glass ribbon, as a result of which adjustment the longitudinal axis of the ribbon is brought on to the longitudinal axis of the conveyor. Said adjustment may, if desired, be combined with the adjustment of the temperature of the glass ribbon over the transverse extent thereof and in the direction of its thickness, as hereinbefore specified.

The guiding of the longitudinal movement of the glass ribbon may be effected in accordance with the invention by any appropriate thermal means. For example, movement can be controlled by means of an electrical heating resistor, sprinkling with one or more fluids or liquids, jets of vapour or gas or other appropriate media, or a combination of such media, applied along the two borders of the glass ribbon, at appropriate points along the length of the glass ribbon, so as to be able to produce at any desired instant a forced or positive change in the temperature of one border or the other, independently of one another, both in the sense of an increase and in the sense of a lowering of the said temperature, or in the sense of a stabilization of the said temperature.

Accordingly, it is obvious that the means for adjusting the marginal temperature of the glass ribbon may be the same as those employed for the adjustment of the temperature throughout the transverse extent of the glass ribbon, or that they may be different or independent thereof, or combined therewith in any appropriate manner.

Preferably, they are disposed above and below the glass ribbon, so as to be able to act together or separately on its two faces.

In practice, the elements for the regulation of the marginal temperature are preferably disposed in gaps between the groups of grinding or polishing tools, each of which groups may comprise any appropraite number of transverse rows of tools.

In the accompanying drawings:

FIGURE 1 illustrates diagrammatically the whole of a known installation for the production of a continuous glass ribbon, from the tank furnace to the polishing stations, inclusive, in which installation the glass ribbon is ground and polished simultaneously on its two faces;

FIGURE 2 shows a "theoretical" curve of the frictional work $t$ of a polishing tool rotating in situ while the glass ribbon is advancing in the direction $x$ of its longitudinal axis, by means of which curve $t$ the performance of the tool can be measured by the ratio $h/H$ (for further details, see for example applicant's Belgian Patent No. 508,474);

FIGURE 3 is a diagrammatic elevational view of a temperature-regulating device according to the invention, which is disposed between the series of tools of two consecutive pairs of beams;

FIGURE 4 is a plan view corresponding to FIGURE 3;

FIGURE 5 is a diagrammatic explanatory plan view of an installation corresponding to FIGURES 3 and 4;

FIGURE 6 illustrates diagrammatically an installation corresponding to that illustrated in FIGURE 5, but modified in such manner as to be suitable more especially for the adjustment of the temperature of the borders;

FIGURE 8 diagrammatically illustrates a detail.

Figure 7:
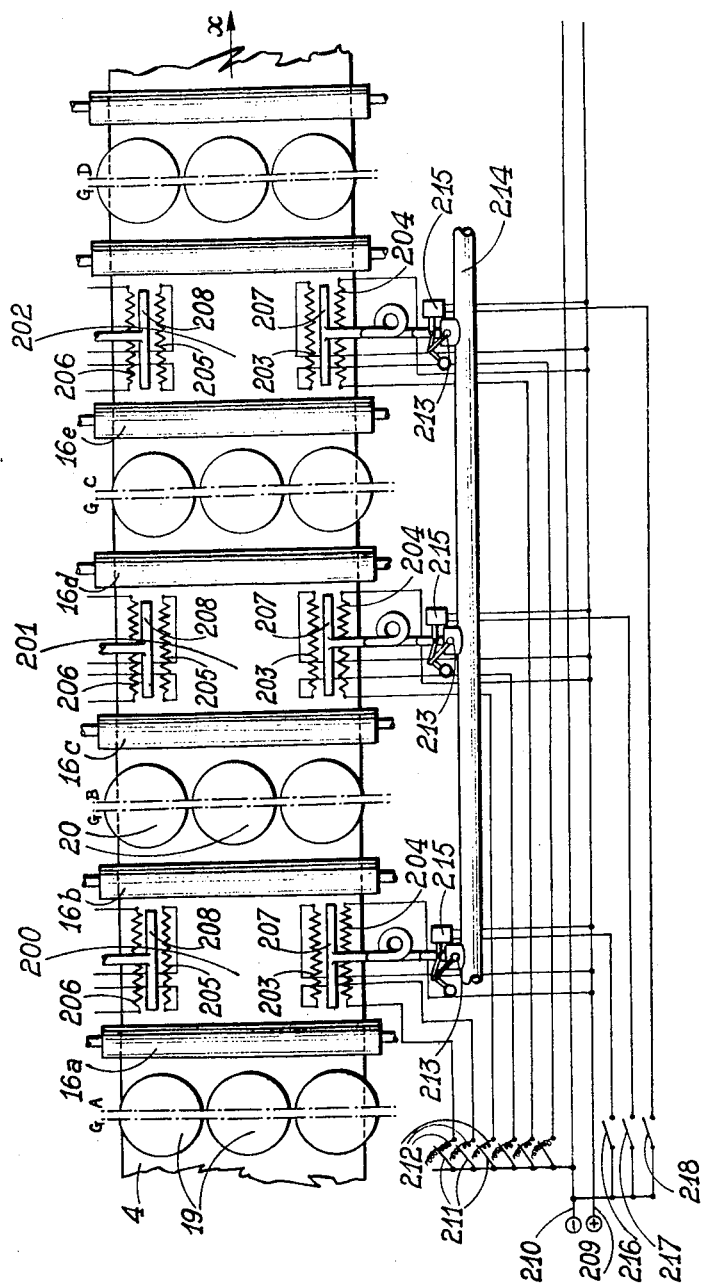
FIGURE 7 illustrates diagrammatically another modified construction of an installation adapted specially for the adjustment of the temperature of the borders.

In a conventional installation of the type illustrated in FIGURE 1, the molten glass 1 leaving the furnace 2 is converted by the rolls 3 into a continuous glass ribbon 4, which passes over conveyor rollers 5 rotating at variable speed through an annealing furnace 6 and thereafter between conveyor roller members 7, 8, 9, 10 and 11, which pass it between the pairs of grinding tools 12, 13 and 14 and then between pairs of conveyor rollers 15, 16, 17 and 18 which pass it between the pairs of polishing tools 19, 20 and 21 so that it continues its travel towards a washing, inspection and cutting station (not shown).

In accordance with the constructional example illustrated in FIGURES 3, 4 and 5, there are left between at least two consecutive pairs of polisher-supporting beams 19–19a–19b, 20–20a–20b, etc., and if desired between at least two consecutive pairs of grinder-supporting beams 12–12a–12b, 13–13a–13b, etc., gaps or areas 22—23—24 of substantial dimensions in the direction of travel of the glass ribbon 4, and there are disposed in each of these gaps, after the upstream pairs of tools 19, etc., and before the downstream pairs of tools 20, etc., pairs of rubber-coated conveyor rollers 16a—16b, etc., of which above all those mounted before the pairs of downstream tools may, if desired, be combined with scrapers (not shown). Finally, there are disposed between the pairs of conveyor rollers 16a—16b, etc., above and below the glass sheet 4, any appropriate temperature-regulating devices, which in the illustrated example each consist of two pairs of banks of sprinklers 25a—25b and 26a—26b which sprinkle hot water at variable temperature. The banks of sprinklers of one of these pairs, for example 25a—25b, advantageously have ejection orifices 27 situated only in the marginal zones of the glass ribbon, that is to say, in the zones of the edges of the latter, while the banks of the other pair, for example 26a—26b, advantageously have ejection orifices 28 situated only in the central zone of the ribbon.

The glass ribbon leaves the grinding zone in the direction of the arrow $x$ (FIGURE 5) at a temperature of about 40° C., which is approximately uniformly distributed in the direction of its thickness and width. The glass ribbon leaves polishers at an increased temperature, which, for the reasons hereinbefore stated under (1) to (5) is unevenly distributed, in the direction of its width, for example as follows: about 70° C. in the two marginal zones and about 60° C. in the central zone of the glass ribbon. In order to render the temperature of the latter uniform, while causing it to rise to about 80° C., the temperature of the water applied to the two faces of the glass ribbon by the sprinkler banks 25a—25b is adjusted to about 80° C. and that of the water applied by the sprinkler banks 26a—26b is adjusted to about 90° C. Under the action of the sprinkling thus effected, the temperature of the glass ribbon is rapidly brought to a uniform value of about 80° C. over the entire cross-section and over the entire width of the ribbon. At the same time, the pairs of conveyor rollers 16a—16b prevent the water from spreading towards the upstream polishing tools 19 and the downstream polishing tools 20. The glass ribbon thus brought to a uniformly distributed increased temperature of about 80° C. thereafter passes between the polishers 20 of the second pair of polishing beams 20a—20b and leaves them at an increased temperature which, for the reasons hereinbefore stated, is unevenly distributed as follows: about 90° C. in the marginal zones and about 80° C. in the central zone of the ribbon. In order to render the temperature of the latter uniform, while causing it to rise to about 85° C., there is applied to the two faces of the glass ribbon through the sprinkler banks 25c—25d water whose temperature is adjusted to about 80° C., and through the sprinkler banks 26c—26d water whose temperature is adjusted to about 90° C. Under the action of this sprinkling, the temperature of the glass ribbon is brought to a uniform value of about 85° C. over the entire cross-section and over the entire width of the ribbon. At the same time, the pairs of conveyor rollers 16c—16d prevent the water from spreading towards the upstream polishing tools 20 and the downstream polishing tools 21. The glass ribbon thus brought to a uniformly distributed temperature of about 85° C. thereafter passes between the polishing tools 21 of the third pair of polishing beams 21a—21b and leaves them at an unevenly distributed increased temperature of about 95° C. in the marginal zones and of about 90° C. in the central zone of the ribbon. In order to bring the glass ribbon to a uniform temperature of about 90° C. throughout its thickness and throughout its width and in order to maintain it at this temperature during its passage between the succeeding series of polishers, it is sufficient to adjust the temperature of the water projected on to the two faces of the ribbon by the sprinkler banks 25e—25f, etc., to about 85° C. and that of the water projected on to the two faces of the ribbon by the sprinkler banks 26e—26f, etc. to about 90° C.

If, due to any accidental causes, the temperature of one part of the ribbon tends to vary undesirably from the desired mean values, for example from those hereinbefore indicated, it is merely necessary to adjust accordingly the temperature or temperatures of the water projected on to the face or faces of the ribbon at the corresponding point or points through the corresponding sprinkler banks.

In the constructional example illustrated in FIGURE 6, the marginal sprinkler banks 25a—25b, 25c—25d, etc. illustrated in FIGURE 5 have each been divided into a pair of separate marginal banks, namely 25A,a,b, 25B,a,b, 25A,c,d, 25B,c,d, etc., these pairs of marginal banks each being combined with a central sprinkler bank 26a,b, 26c,d, etc. The separate banks 25A,a,b, 25B,a,b and 25A,c,d, 25B,c,d, etc. of each of the pairs of marginal banks, are connected by flexible connecting pipes 100A,x, 100B,x, 100C,x, 100D,x and ducts 100A, 100B and 100C, 100D respectively to a common three-way cock 101, 102, the said three-way cocks being connected on the one hand with the aid of a two-way cock 103, 104 to a duct 105 carrying hot fluid, for example hot water, and a duct 106 carrying cold fluid, for example cold water. Likewise, the central banks 26a,b, 26c,d are connected through flexible pipes 100E,x, 100F,x to ducts supplying a fluid at variable temperature, for example water at variable temperature, 100E,y, 100F,y, through valves 100E,z, 100F,z, which may be adjustable from a distance. It will readily be appreciated from the foregoing that the device according to FIGURE 6 makes it possible to render the temperature of the glass ribbon 4 uniform not only in the manner hereinbefore described with reference to FIGURE 5, but also in the sense of a correction of the differences of the marginal temperatures of the glass ribbon 4 owing to the possibility of subjecting each border of the said ribbon optionally and separately to a heating or to a cooling, or to neither, for a desired period of time, by an appropriate operation of the cocks 101, 103; 102, 104, etc., so as to avoid lateral deviations of the longitudinal movement of the glass ribbon in one direction or the other, or to bring the longitudinal axis of the glass ribbon into coincidence with the longitudinal axis of the conveyor of the machine, and to maintain it therein, in the event of a difference having been produced between these two axes as a result of an excessive difference between the marginal temperatures of the glass ribbon, and at the same time to maintain the glass ribbon at a desired adjusted temperature over its entire width.

It is to be noted that in the apparatus according to FIGURE 6 the banks 25A,a,b, 25B,a,b, 25A,c,d, 25B,c,d, etc., may be usefully disposed, not between two transverse rows of grinding and/or polishing tools 19, 20, etc. in each instance, but only between two groups of, for example, five transverse rows of such tools in each instance. This has been indicated in the drawing by the pairs of dash-dotted lines w,y extending through the rows of tools 19 and 20.

FIGURE 7 illustrates a modified embodiment of the invention in which use is made, between the each pair of consecutive groups GA, GB, GC, GD, etc. of, for example, five transverse rows of grinding and/or polishing tools of a combined marginal heating system consisting electrical resistances and pneumatic means.

Disposed in each of the gaps 200, 201, 202, etc., between the said consecutive groups of tools, along each border or marginal zone of the glass ribbon 4, above and below the latter, is a system of two electrical heating resistors 203, 204 and 205, 206 which are combined with a bank of nozzles for blowing a fresh fluid or a fluid at variable temperature, for example fresh air, 207, 208 (the corresponding systems situated below the glass ribbon cannot be seen). The said heating resistors are connected to a current supply conductor 209, 210 through resistance contacts 211, 212 in the gap 200; 211, 212 in the gap 201; 211, 212 in the gap 202, and so on. Likewise, the blowing banks 207, 208 are separately connected by a valve 213 in the gap 200, 213 in the gap 201, 213 in the gap 202, and so on, to a compressed-air duct 214, each of the said valves being separately controlled by a relay 215 which is in turn connected to a conductor 209, 210 through contacts 216, 217, 218, etc.

The embodiment of the invention as illustrated in FIGURE 7 advantageously lends itself to the adjustment of the direction of the longitudinal travel of the glass ribbon by the adjustment of the temperature of its borders, independently of the adjustment of the temperature of the glass ribbon over the entire width of the latter. However, it is obvious that the device according to FIGURE 7 may be combined in any appropriate manner, for example, with that according to FIGURE 5.

In the embodiment illustrated in FIGURE 6, the marginal banks 25A,a,b, 25B,a,b, 25A,c,d, 25B,c,d, etc., as also the central banks 25a,b, 26c,d, etc., may be supported by lateral parts of the frame of the machine in such manner as to be displaceable vertically, transversely and longitudinally in relation to the glass ribbon 4, with the aid of flexible connecting elements 100Ax, 100Bx, 100Cx, 100Dx, 100Ex, 100Fx. The same is the case with the elements 203, 204 and 207 for the regulation of the marginal temperatures according to FIGURE 7, although in the latter case the flexible connecting elements have been omitted from the drawing for the sake of clarity.

This triple adjustment of the position may be effected, for example, by means of a device of the type illustrated in FIGURE 8, in which 220 is a fixed support, for example an appropriate part of the frame of the machine, 221 a longitudinal guide plate fixed to 220 and on which there is displaceable in the longitudinal direction of the glass ribbon 4, with the aid of a screw and crank control 222, a carriage 223 on which there is displaceable transversely in relation to the glass ribbon, with the aid of a screw and crank control 224, a carriage 225 on which there is vertically displaceable in relation to the glass ribbon, by means of a screw and crank control 226, a carriage 227 supporting the temperature-regulating element 228.

Generally speaking, the manner in which the invention is carried into practice may be modified in many respects without departing therefrom. Thus, for example, the adjustment of the quantity of heat transmitted to the glass ribbon or removed therefrom at the desired points may be effected by any appropriate combination of appropriate means, for example banks of liquid or gas jets combined with electrical resistors, for example of the type described with reference to FIGURE 7, or by electromagnetic oscillation generators operating at adjustable high frequency, by means of which it is possible to adjust the temperature of the glass ribbon at will at a large number of points distributed over the area occupied by the temperature-regulating devices. Moreover, if the heat vehicle or the heat generator is not a liquid, for example when a gas at adjustable temperature or an electrical resistor is employed, or induced high-frequency electromagnetic oscillations are employed, the use of barriers consisting of means such as, for example, rubber-coated rollers or scrapers, may be unnecessary or superfluous, so that such barriers may be omitted and the temperature-adjustment areas separating two consecutive series of tools may be shortened.

It will be understood that the method and the apparatus hereinbefore described may be of non-automatic, semi-automatic or fully automatic form, it being possible to produce the automatic action with the aid of any heat-responsive device provided at the desired points and controlling the distribution of the temperature-regulating fluid.

I claim:

1. Apparatus for working a glass ribbon comprising means defining a plurality of working zones in longitudinally spaced relation, said glass ribbon being longitudinally advanced through said working zones, and at least one variable heat source between said adjacent zones and operatively disposed with respect to said ribbon to heat the same to selectively adjust the temperature of said ribbon thereby establishing a predetermined temperature gradient therein, the means defining a plurality of working zones including longitudinally spaced working tools respectively in said zones.

2. Apparatus as claimed in claim 1 comprising a plurality of variable heat sources in transversely spaced relation, said ribbon having end portions and a central portion, one of said variable heat sources corresponding to each of said portions and being adjacent the same, said heat sources being adapted to independently control the temperature of the portion of the glass ribbon adjacent thereto.

3. Apparatus as claimed in claim 2 wherein said ribbon has opposite faces and said heat sources are adjacent each of the faces.

References Cited in the file of this patent

UNITED STATES PATENTS

| | | |
|---|---|---|
| 1,667,146 | Drake | Apr. 24, 1928 |
| 1,895,934 | Leyland | Jan. 31, 1933 |
| 1,959,225 | Wilhelm et al. | May 15, 1934 |
| 1,996,369 | Ely | Apr. 2, 1935 |
| 2,667,018 | Dunipace et al. | Jan. 26, 1954 |

FOREIGN PATENTS

| | | |
|---|---|---|
| 454,697 | Great Britain | Oct. 6, 1936 |
| 603,168 | Great Britain | June 10, 1948 |